United States Patent
Cui et al.

(10) Patent No.: US 11,284,357 B2
(45) Date of Patent: Mar. 22, 2022

(54) POWER HEADROOM REPORTING FOR SHORTENED TRANSMISSION TIME INTERVALS

(71) Applicant: Apple Inc., Cupertino, CA (US)

(72) Inventors: Jie Cui, Santa Clara, CA (US); Hong He, Sunnyvale, CA (US); Yang Tang, Pleasanton, CA (US); Yuan Zhu, Beijing (CN); Shuang Tian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 16/476,375

(22) PCT Filed: Jan. 31, 2018

(86) PCT No.: PCT/US2018/016306
§ 371 (c)(1),
(2) Date: Jul. 8, 2019

(87) PCT Pub. No.: WO2018/144643
PCT Pub. Date: Aug. 9, 2018

(65) Prior Publication Data
US 2020/0045651 A1   Feb. 6, 2020

Related U.S. Application Data

(60) Provisional application No. 62/453,973, filed on Feb. 2, 2017.

(51) Int. Cl.
*H04W 52/36* (2009.01)
*H04W 72/04* (2009.01)
(Continued)

(52) U.S. Cl.
CPC ........... *H04W 52/365* (2013.01); *H04L 5/001* (2013.01); *H04W 52/225* (2013.01);
(Continued)

(58) Field of Classification Search
CPC ............. H04W 52/365; H04W 52/225; H04W 52/367; H04W 72/044; H04W 72/0406; H04L 1/001
See application file for complete search history.

(56) References Cited

U.S. PATENT DOCUMENTS

| | | |
|---|---|---|
| 2013/0044831 A1 | 2/2013 | Narasimha et al. |
| 2016/0323887 A1 | 11/2016 | Patel et al. |
| 2018/0035394 A1 | 2/2018 | Lee |
| 2018/0076942 A1* | 3/2018 | Nory .................. H04W 52/346 |

(Continued)

OTHER PUBLICATIONS

"Power headroom reporting issue for sTTI operation" ITRI. 3GPP TSG RAN WG1 Meeting #87, Reno, USA, Nov. 14-18, 2016, R1-1612195. 2 pages. (Year: 2016).*

(Continued)

*Primary Examiner* — Kent Krueger
(74) *Attorney, Agent, or Firm* — Eschweiler & Potashnik, LLC

(57) ABSTRACT

A UE may estimate the power headroom value when using shortened Transmission Time Intervals (sTTI). In one implementation, the power headroom value may be calculated based on an estimation of the UE transmission power over two or seven OFDM symbols. Alternatively or additionally, the power headroom value may be calculated based on an estimation of the UE transmission power over the period of an sTTI. Alternatively or additionally, the power headroom value may be calculated based on an average of the UE transmission power over multiple sTTI periods in a subframe. Alternatively or additionally, the power headroom value may be calculated based on a maximum or minimum of the UE transmission power measured over multiple sTTI periods in a subframe. Alternatively or additionally, the (Continued)

power headroom value may be calculated based on UE transmission power measured in the first or the last sTTI period in a subframe.

8 Claims, 12 Drawing Sheets

(51) Int. Cl.
*H04L 5/00* (2006.01)
*H04W 52/22* (2009.01)

(52) U.S. Cl.
CPC ..... *H04W 52/367* (2013.01); *H04W 72/0406* (2013.01); *H04W 72/044* (2013.01)

(56) References Cited

U.S. PATENT DOCUMENTS

| | | | |
|---|---|---|---|
| 2018/0077651 A1* | 3/2018 | Nory | H04L 5/0007 |
| 2018/0077658 A1* | 3/2018 | Nory | H04W 52/346 |
| 2018/0077718 A1* | 3/2018 | Nory | H04L 1/1854 |
| 2018/0077719 A1* | 3/2018 | Nory | H04W 28/0278 |
| 2019/0174432 A1* | 6/2019 | Wang | H04W 72/1289 |
| 2019/0268861 A1* | 8/2019 | Takeda | H04W 72/0473 |

OTHER PUBLICATIONS

"sPUSCH power control and PHR report for sTTI" Ericsson. 3GPP TSG RAN WG1 Meeting #87, Reno, USA, Nov. 14-18, 2016, R1-1611523. 4 pages. (Year: 2016).*

"Considerations on sTTI length"ZTE. 3GPP TSG RAN WG1 Meeting #87, Reno, USA, Nov. 14-18, 2016, R1-1611456. 4 pages. (Year: 2016).*

"Discussion on UL sTTI length and structure" Huawei, HiSilicon, 3GPP TSG RAN WG1 Meeting #87, Reno, USA, Nov. 14-18, 2016, R1-1611155 5 pages. (Year: 2016).*

International Search Report dated Apr. 24, 2018 for International Application No. PCT/US2018/016306.

"UL power control for short TTI." Agenda Item: 6.2.10.2.7. Source: Huawei, HiSilicon. 3GPP TSG RAN WG1 Meeting #87, Reno, USA, Nov. 14-18, 2016. R1-1611161. 5 pages.

* cited by examiner

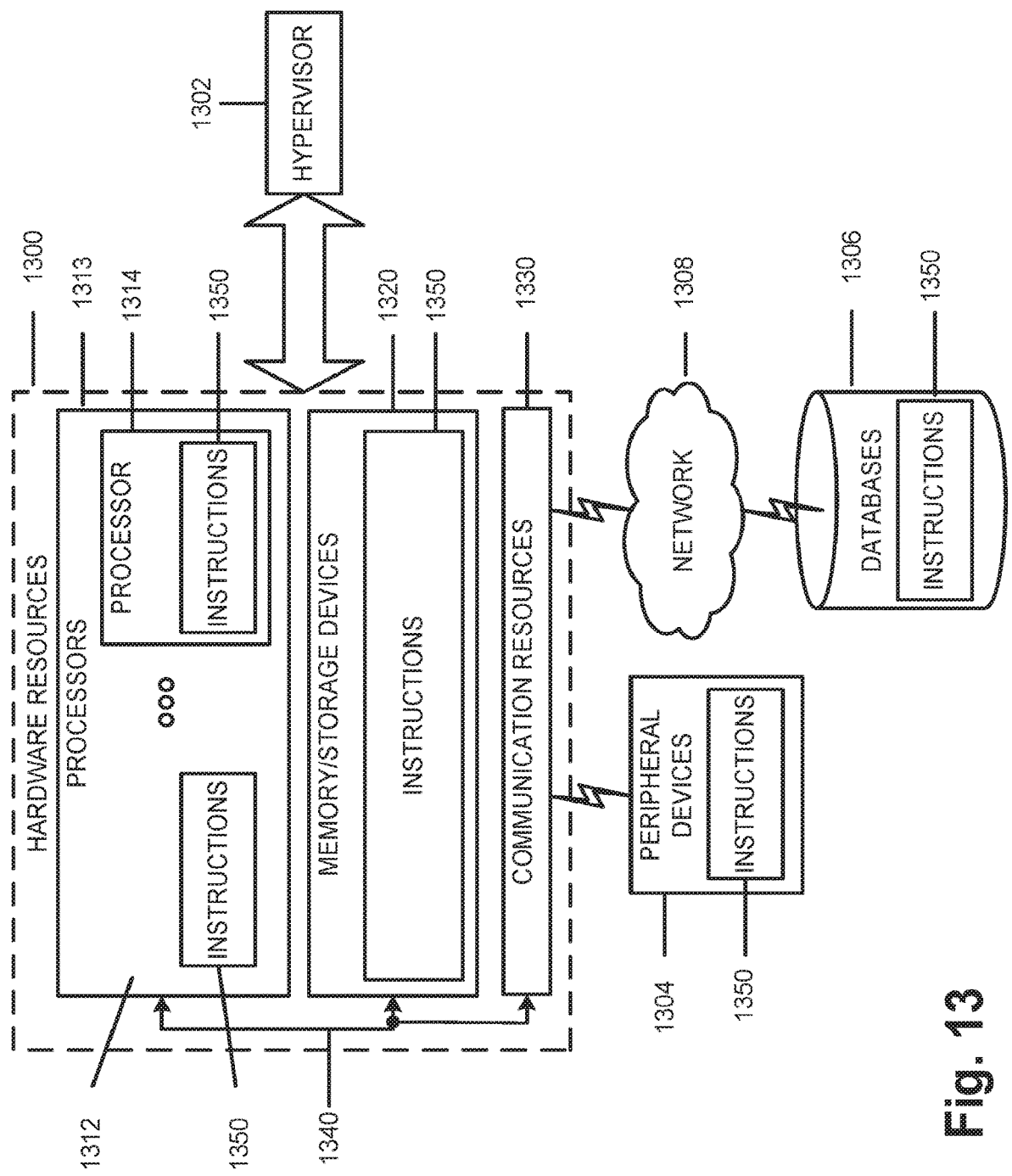

POWER HEADROOM REPORTING FOR SHORTENED TRANSMISSION TIME INTERVALS

RELATED APPLICATIONS

This application is a National Phase entry application of International Patent Application No. PCT/US2018/016306 filed Jan. 31, 2018, which claims priority to U.S. Provisional Patent Application No. 62/453,973, filed Feb. 2, 2017, entitled "POWER HEADROOM REPORTING FOR SHORTENED TRANSMISSION TIME INTERVALS" in the name of Jie Cui et al. and is hereby incorporated by reference in its entirety.

BACKGROUND

In telecommunications networks based on the Third Generation Partnership Project (3GPP) standards for cellular communications, data may be transmitted using Orthogonal frequency-division multiplexing (OFDM). In OFDM, a large number of closely spaced orthogonal sub-carrier signals with overlapping spectrum may be used to carry data. In OFDM based-communications, the smallest unit of data, which may represent one or multiple bits of information, is referred to as a symbol.

A Transmission Time Interval (TTI) is the smallest unit of time in which a base station is capable of scheduling a user for uplink or downlink transmission. In the Long Term Evolution (LTE) 3GPP standards, a TTI covered 14 OFDM symbols (i.e., one subframe). In Advanced LTE, the concept of a shortened TTI (sTTI) was introduced. The sTTI interval can be as short as two or seven OFDM symbols. For example, in one configuration, the downlink/uplink interval for sTTI may be 2/7 OFDM symbols. Other configurations, such as 2/2 and 7/7 are also possible.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The "power headroom" of a UE may refer to an amount of transmission power that is left for a UE to use in addition to the power currently being used by the UE. For instance, the power headroom, for a UE, may be calculated as the UE configured maximum output power ($P_{CMAX}$) minus the current estimated power for uplink transmission. In essence, the power headroom may represent the maximum additional amount of power that can be used, if needed, by the UE. The power headroom value may be transmitted, by the UE, to an eNB, as part of a "power headroom report."

Under legacy TTI, a UE may estimate the power headroom value over 1 subframe (14 OFDM symbols). With sTTI, estimating the power headroom value over 1 subframe may not be appropriate. Techniques are described herein for appropriately estimated the power headroom value, by a UE, when using sTTI.

Figure 1:
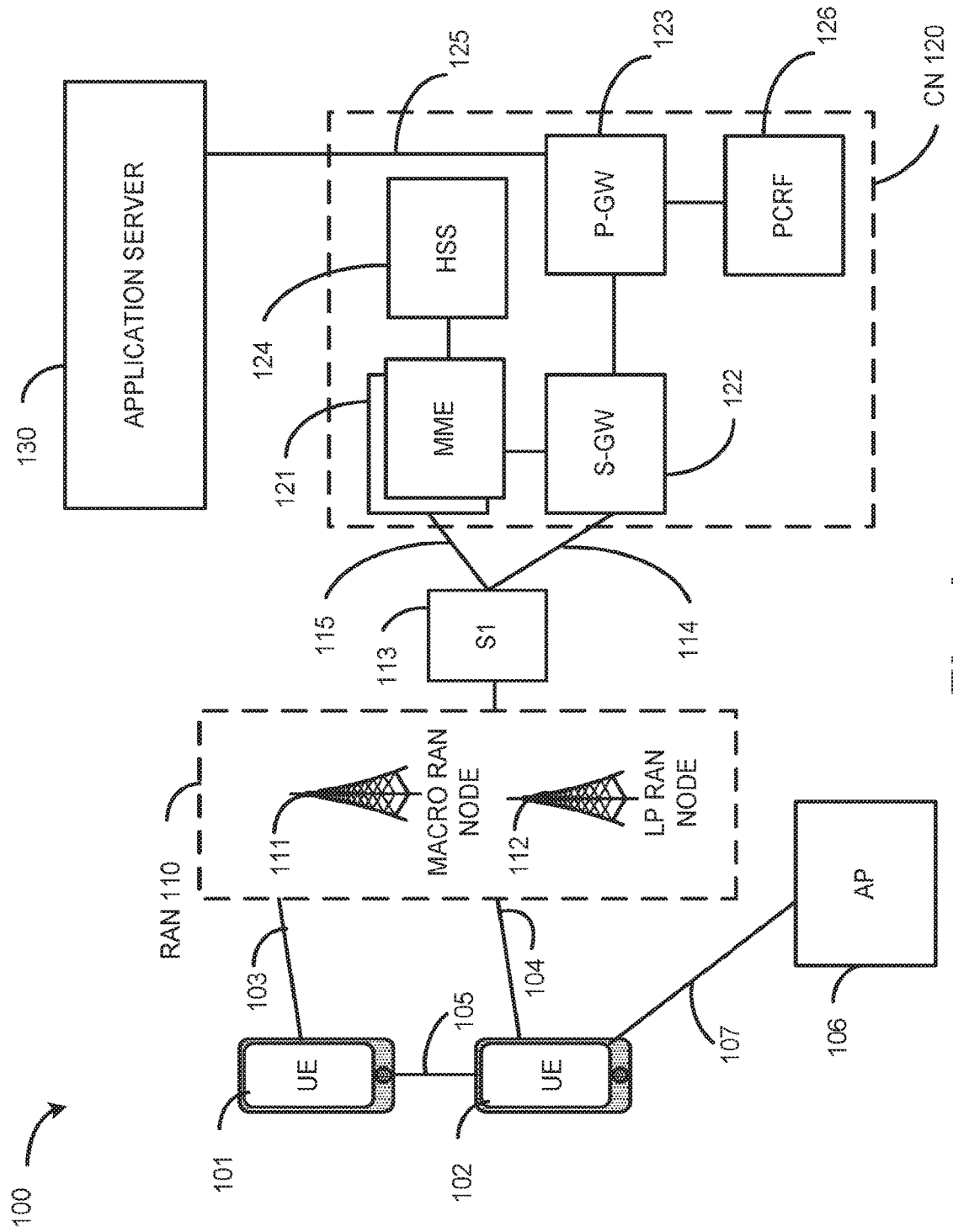
FIG. 1 illustrates an architecture of a system in accordance with some embodiments.

FIG. 1 illustrates an architecture of a system 100 in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMES 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2A:
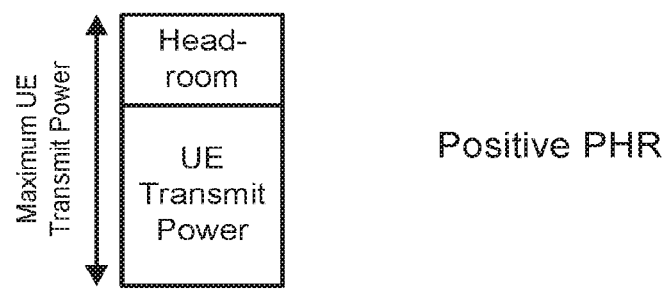
FIGS. 2A and 2B are diagrams illustrating the concept of power headroom.
Figure 2B:
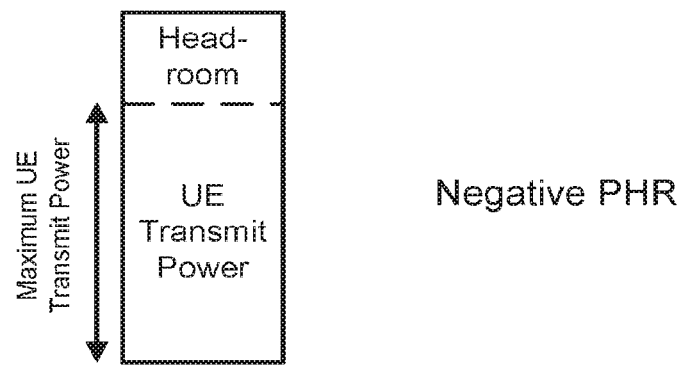

FIGS. 2A and 2B are diagrams illustrating the concept of power headroom. A UE may estimate the current power headroom of the UE, and report the value, to the eNB, in a power headroom report (PHR). The power headroom value may be reported, for example, in the range of −23 dB to 40 dB, where positive values indicate the difference between the possible permitted UE transmit power and the current UE transmit power, and negative values indicate the difference between the maximum possible UE transmit power and the calculated UE transmit power.

As shown in FIG. 2A, for a positive PHR, additional power is available ("head room"), in addition to the current UE transmit power, for the UE to potentially transmit. As shown in FIG. 2B, for a negative PHR, the calculated UE transmit power is greater than the maximum UE transmit power. In this case, the "headroom" represents an amount that the UE transmit power is greater than the target maximum UE transmit power.

Figure 3:
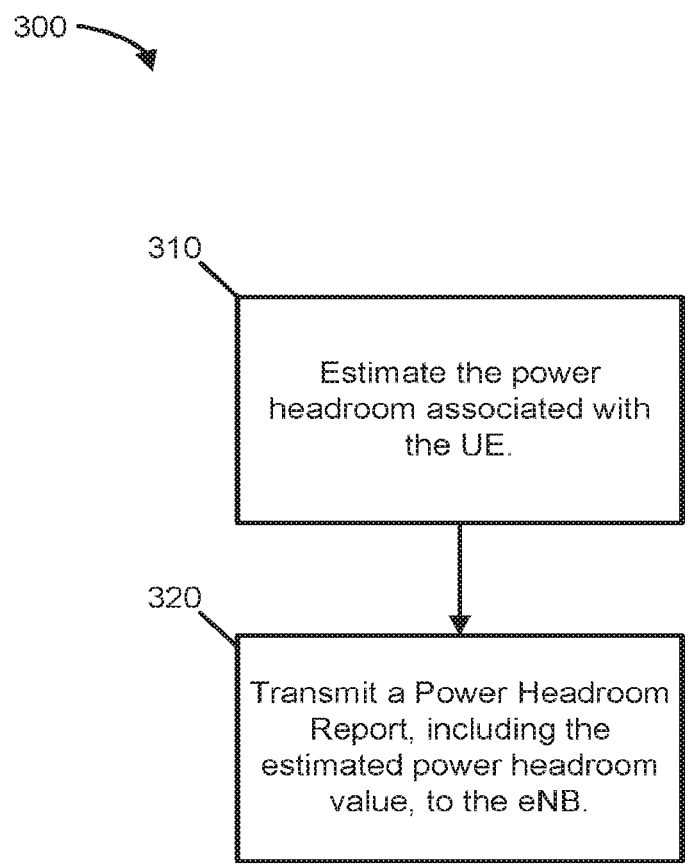
FIG. 3 is a flowchart illustrating an example process relating to estimating and reporting of power headroom.

FIG. 3 is a flowchart illustrating an example process 300 relating to estimating and reporting power headroom. Process 300 may be performed by, for example, UE 101.

Process 300 may include estimating the power headroom of UE 101 (block 310). As previously mentioned, the power headroom for a UE may be estimated as the amount transmission power that is left for the UE to use. For example, the power headroom, for a UE, may be calculated as PCMAX minus the current estimated (e.g., measured) power that is being used for uplink transmission.

A number of particular techniques, for estimating power headroom (block 310), when using sTTI, will be described below with reference to FIGS. 4-10.

UE 101 may transmit an indication of the estimated power headroom to eNB 111. The power headroom estimation may be transmitted as part of a power headroom report (block 320). eNB 111 may use the power headroom report when subsequently controlling UE 101 or other UEs attached to the eNB. For example, when the UE reports a positive power headroom value, eNB 111 may control the UE to increase the transmit power in order to reduce transmission errors.

Figure 4:
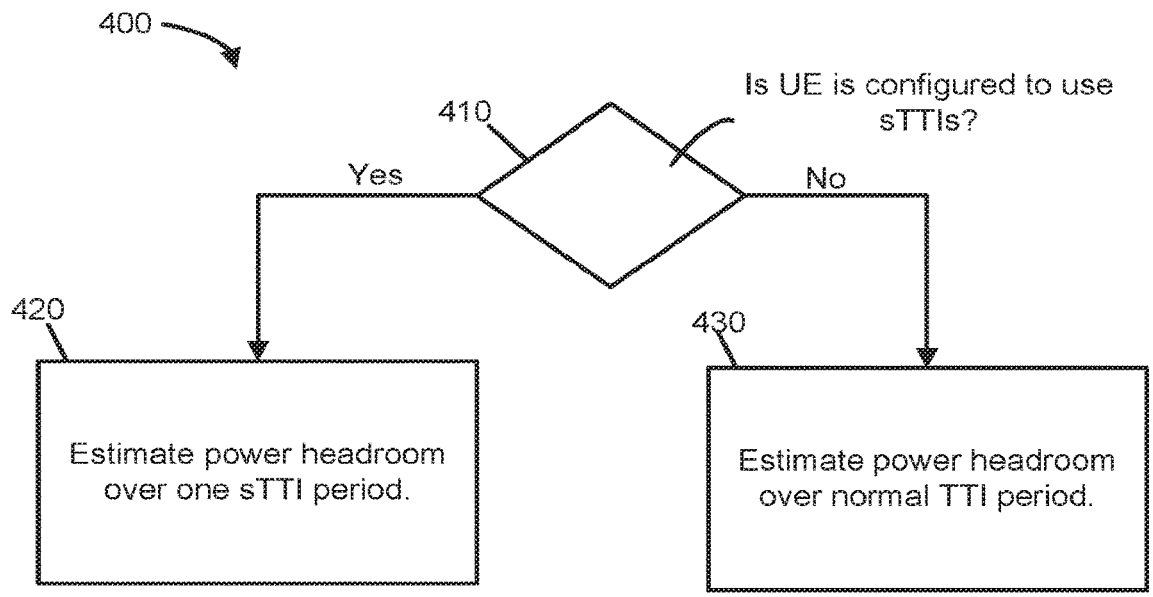
FIGS. 4-10 are flow charts illustrating example processes by which a UE may measure power headroom.

FIG. 4 is a flow chart illustrating an example process 400, according to a first embodiment, by which a UE may measure power headroom. Process 400 may correspond to an implementation of block 310 (FIG. 3).

Process 400 may include determining whether the UE is configured to use sTTIs (block 410). A UE that is capable of using sTTI may be configured, by eNB 111, to use sTTI. When the UE is determined to be using sTTI (block 410—Yes), process 400 may include estimating the power headroom over one sTTI (block 420). In this situation, the power headroom value may thus be estimated over 2 or 7 consecutive OFDM symbols. When the UE is determined to not be using sTTI (block 410—No), process 400 may include estimating the power headroom over the TTI (non-sTTI) interval (block 430). In this case, the TTI interval may be estimated over one subframe.

Figure 5:
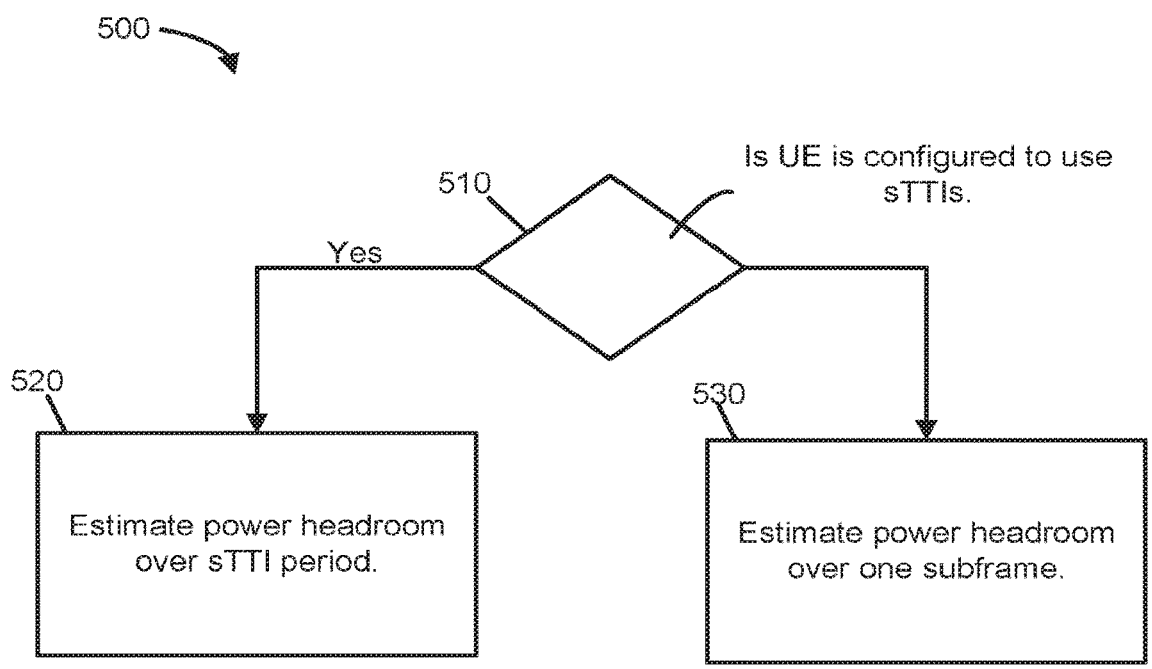

FIG. 5 is a flow chart illustrating an example process 500, according to a second embodiment, by which a UE may measure power headroom. Process 500 may correspond to an implementation of block 310 (FIG. 3).

Process 500 may include determining whether the UE is configured to use sTTIs (block 510). When the UE is determined to be using sTTI (block 510—Yes), process 500 may include estimating the power headroom over one sTTI (block 520). In this situation, the power headroom value may thus be estimated over 2 or 7 OFDM symbols. When the UE is determined to not be using sTTI (block 510—No), process 500 may include estimating the power headroom over one subframe (block 530).

In a third embodiment, UE 101 may estimate the power headroom value over a predetermined number of symbols. For example, the predetermined number may be a value that is configured by eNB 111. Alternatively or additionally, the predetermined number may be set by UE 101, such as by setting the predetermined number of symbols to be a value equal to the amount of symbols in one sTTI or TTI.

In a fourth embodiment, UE 101 may determine the power headroom value over one subframe. The determination may be performed by the UE estimating the transmission power used for each sTTI period within the subframe. The UE may average the transmission powers corresponding to each of the sTTIs to obtain the transmission power that will be used to derive the power headroom value that is reported in the power headroom report.

Figure 6:
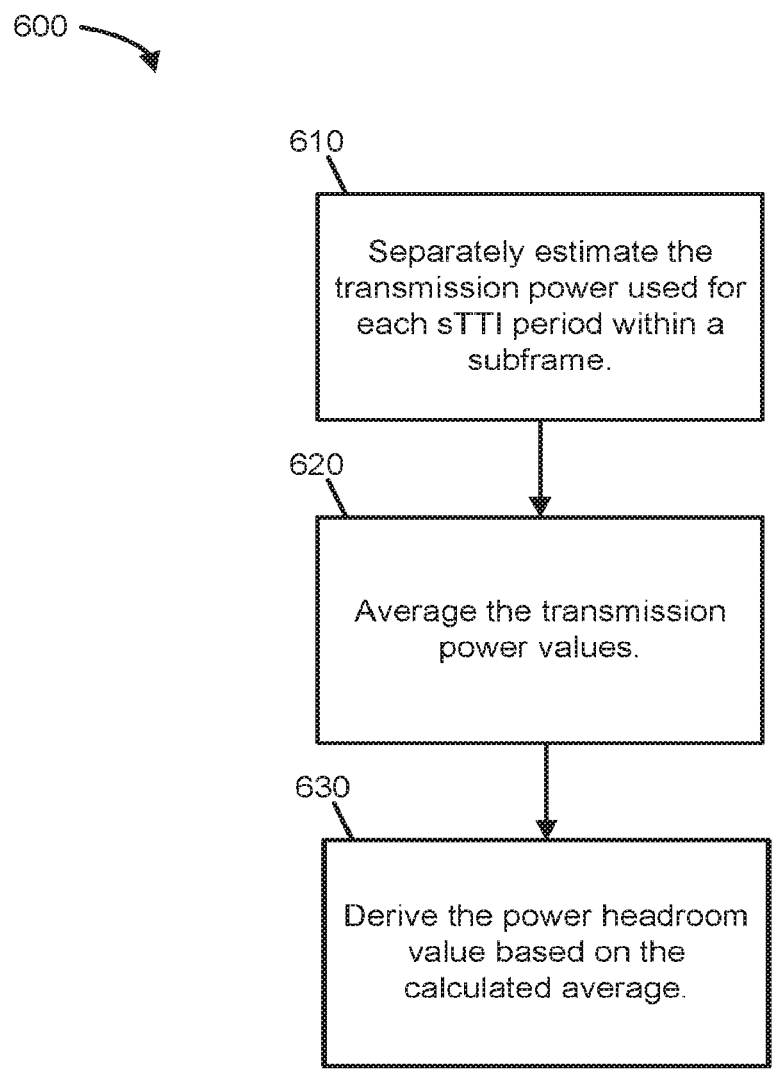

FIG. 6 is a flow chart illustrating an example process 600, according to the fourth embodiment, by which a UE may measure power headroom. As shown, the UE may separately estimate (e.g., measure or calculate) the transmission power over each sTTI period in a subframe (block 610). The UE may then average the estimated values (block 620) and use the average value to derive the power headroom value that is reported in the power headroom report (block 630).

In a fifth embodiment, UE 101 may determine the power headroom value over one subframe. The determination may be performed by the UE estimating the transmission power used for each sTTI period within the subframe. The UE may select the maximum transmission power of each of the sTTIs to obtain the transmission power that will be used to derive the power headroom value that is reported in the power headroom report.

Figure 7:
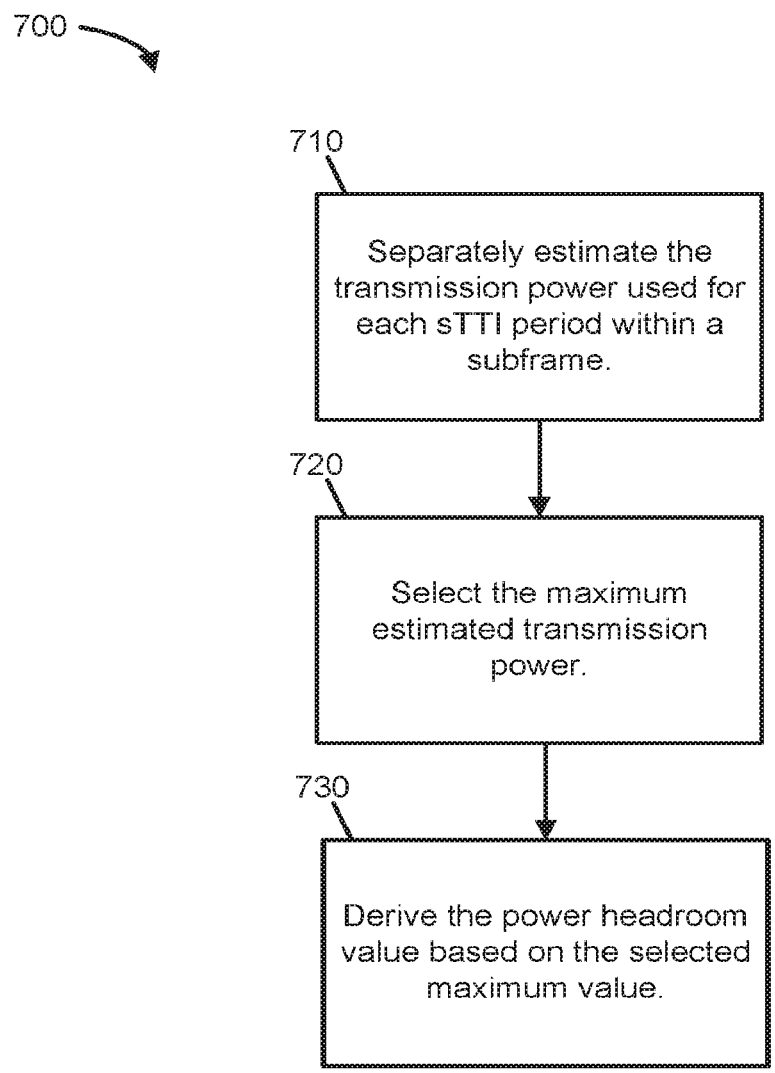

FIG. 7 is a flow chart illustrating an example process 700, according to the fifth embodiment, by which a UE may measure power headroom. As shown, the UE may separately estimate the transmission power over each sTTI period in a subframe (block 710). The UE may then select the maximum transmission power, of these separately estimated transmission powers (block 720), and use the selected maximum value to derive the power headroom value that is reported in the power headroom report (block 730).

In a sixth embodiment, UE 101 may determine the power headroom value over one subframe. The determination may be performed by the UE estimating the transmission power used for each sTTI period within the subframe. The UE may select the minimum transmission power of each of the sTTIs to obtain the transmission power that will be used to derive the power headroom value that is reported in the power headroom report.

Figure 8:
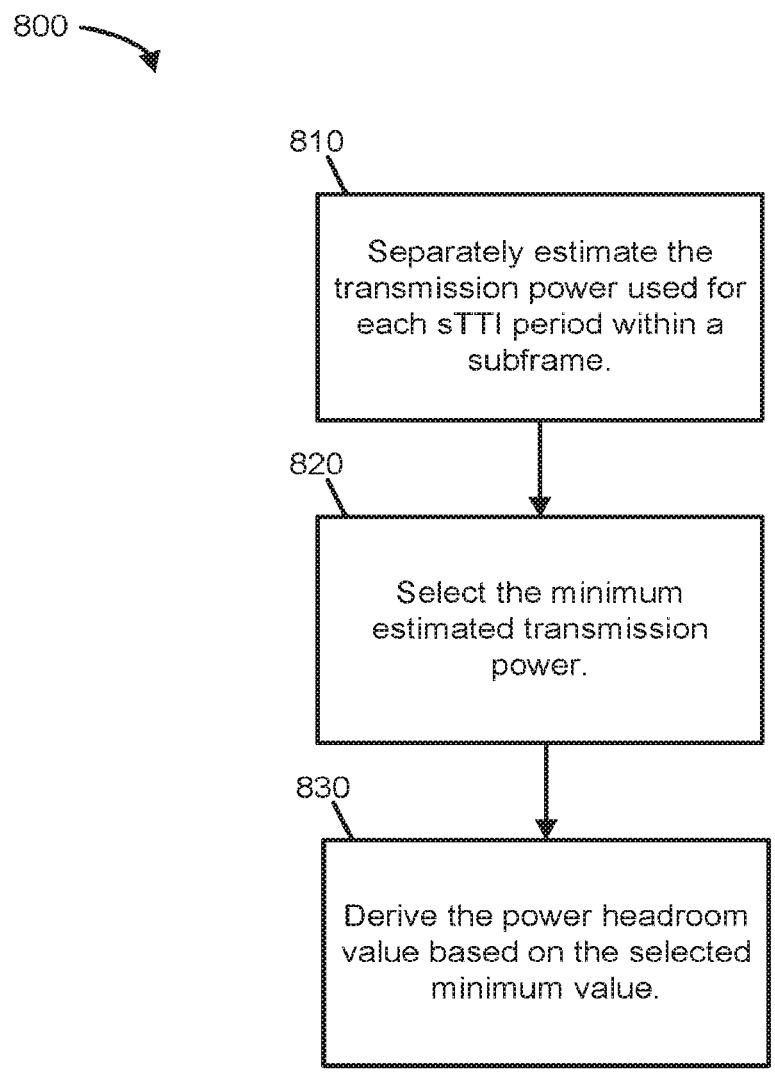

FIG. 8 is a flow chart illustrating an example process 800, according to the sixth embodiment, by which a UE may measure power headroom. As shown, the UE may separately estimate the transmission power over each sTTI period in a subframe (block 810). The UE may then select the minimum transmission power, of these separately estimated transmission powers (block 820), and use the selected minimum value to derive the power headroom value that is reported in the power headroom report (block 830).

In a seventh embodiment, UE 101 may determine the power headroom value over one subframe. The determination may be performed by the UE estimating the transmission power used for each sTTI period within the subframe. The UE may select the transmission power of the first sTTI, within the subframe, and use that selected value to derive the power headroom value that is reported in the power headroom report.

Figure 9:
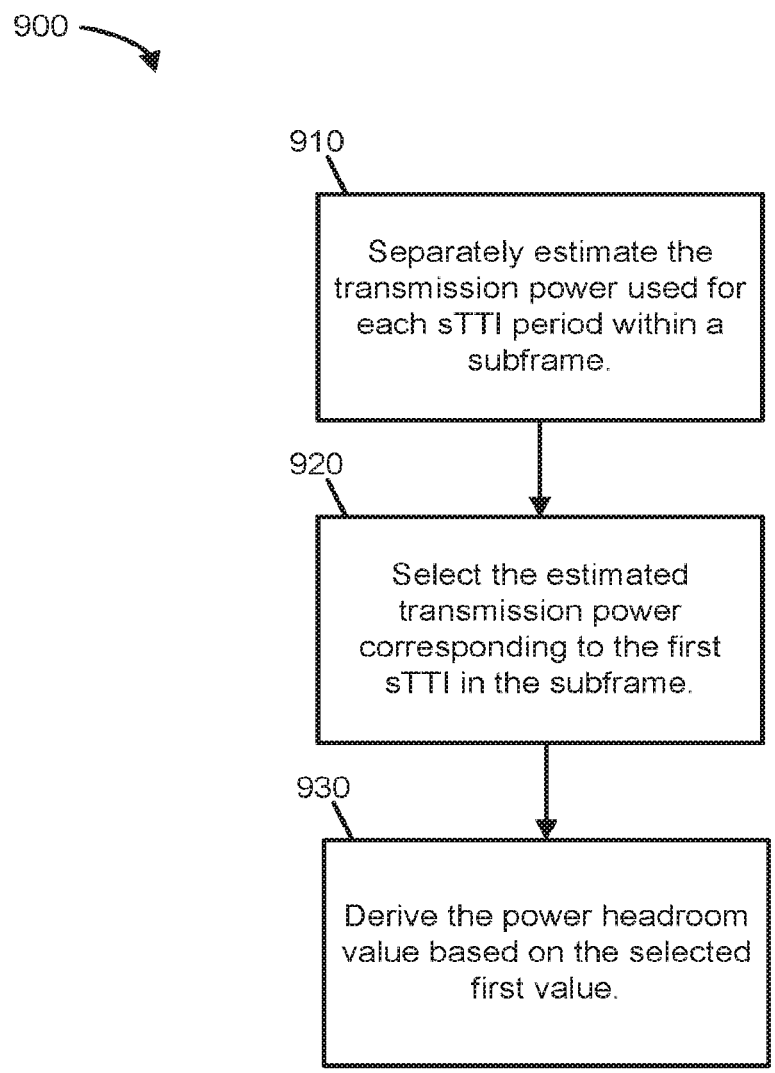

FIG. 9 is a flow chart illustrating an example process 900, according to the seventh embodiment, by which a UE may measure power headroom. As shown, the UE may separately estimate the transmission power over each sTTI period in a subframe (block 910). The UE may then select the transmission power estimated over the first sTTI, of the subframe (block 920), and use the selected first transmission power value to derive the power headroom value that is reported in the power headroom report (block 930).

In an eighth embodiment, UE 101 may determine the power headroom value over one subframe. The determination may be performed by the UE estimating the transmission power used for each sTTI period within the subframe. The UE may select the transmission power of the last sTTI, within the subframe, and use that selected value to derive the power headroom value that is reported in the power headroom report.

Figure 10:
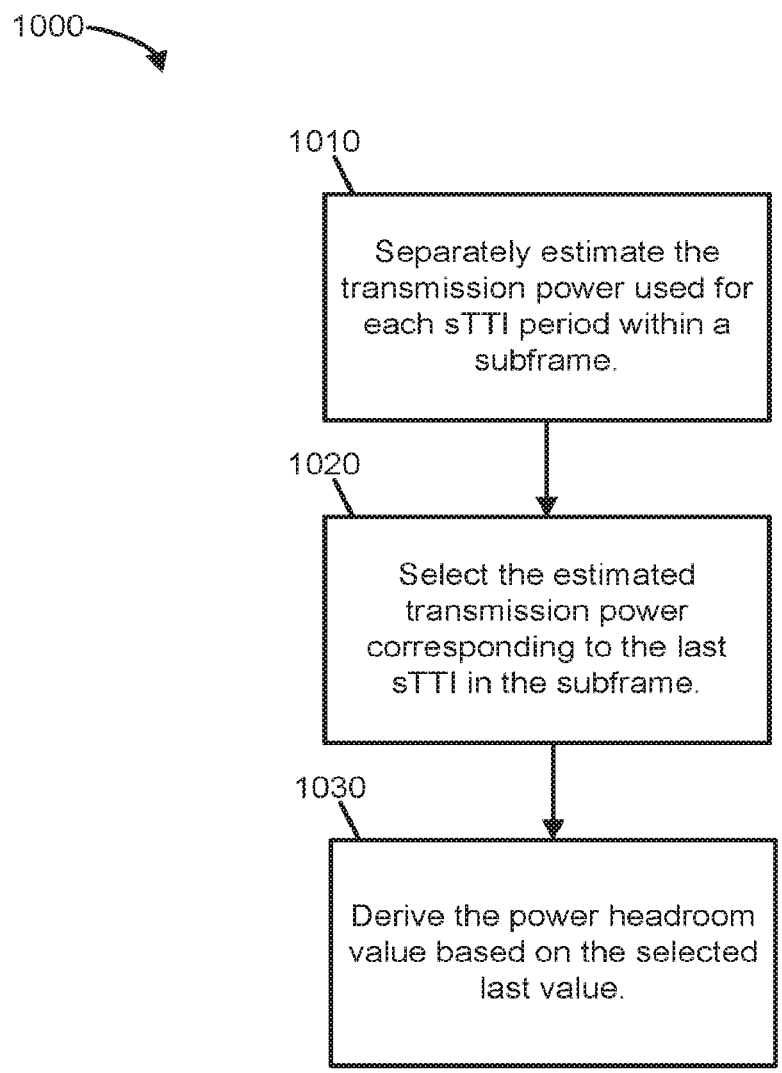

FIG. 10 is a flow chart illustrating an example process 1000, according to the eighth embodiment, by which a UE may measure power headroom. As shown, the UE may separately estimate the transmission power over each sTTI period in a subframe (block 1010). The UE may then select the transmission power estimated over the last sTTI, of the subframe (block 1020), and use the selected transmission power value to derive the power headroom value that is reported in the power headroom report (block 1030).

As used herein, the term "circuitry," "processing circuitry," or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 11:
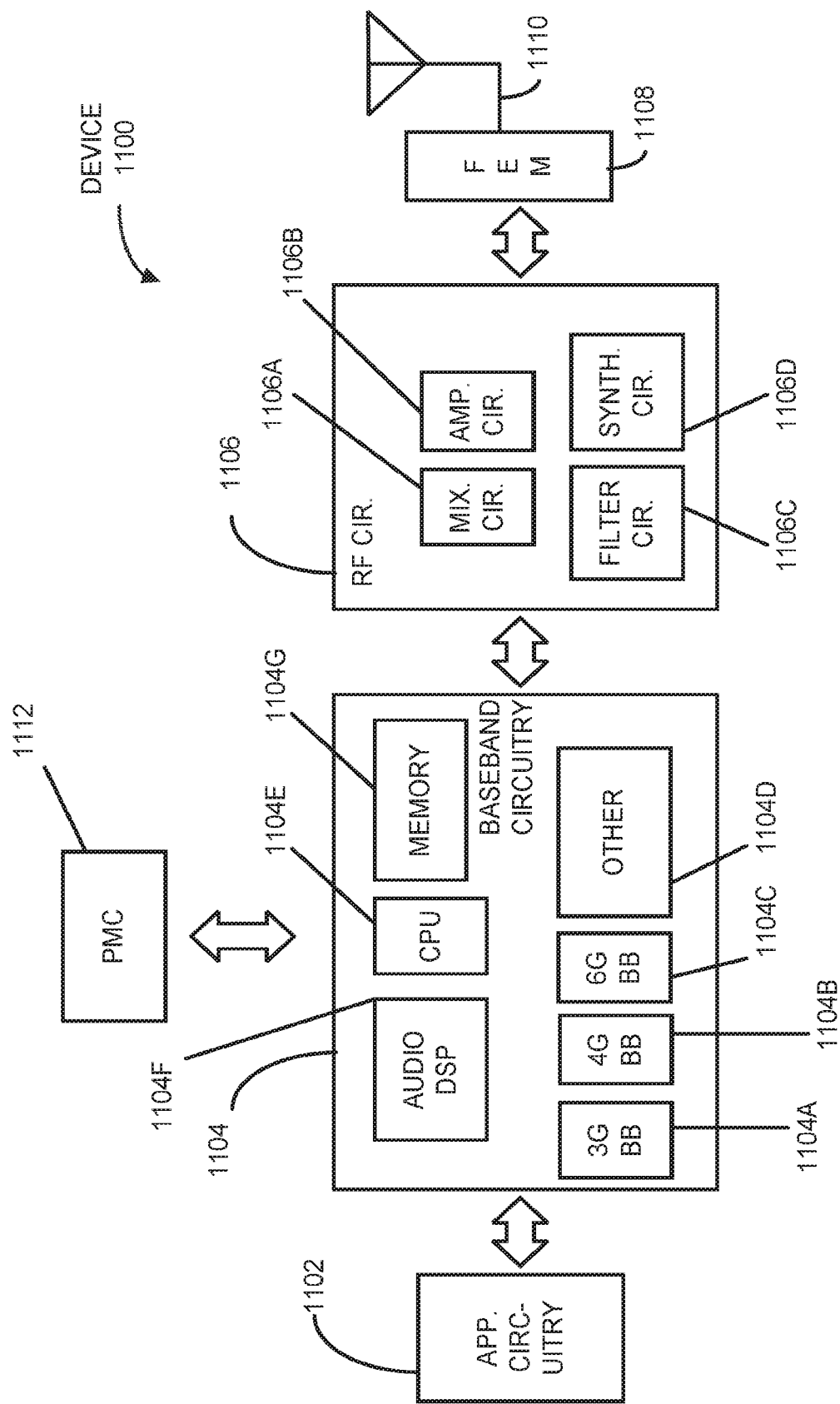
FIG. 11 illustrates example components of a device in accordance with some embodiments.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 1112 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
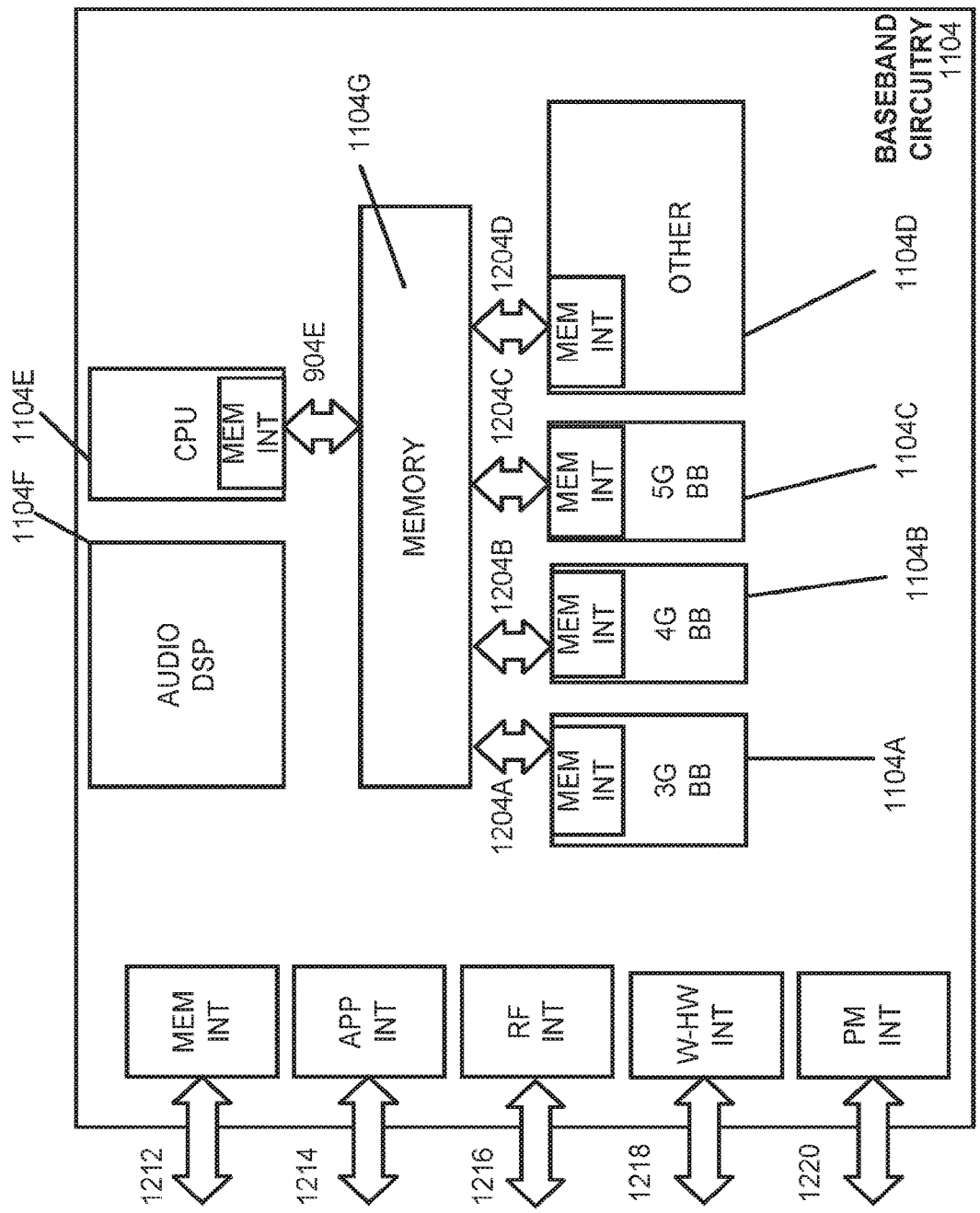
FIG. 12 illustrates example interfaces of baseband circuitry in accordance with some embodiments.

FIG. 12 illustrates example interfaces of baseband circuitry in accordance with some embodiments. As discussed above, the baseband circuitry 1104 of FIG. 11 may comprise processors 1104A-1104E and a memory 1104G utilized by said processors. Each of the processors 1104A-1104E may include a memory interface, 1204A-1204E, respectively, to send/receive data to/from the memory 1104G.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314.

The memory/storage devices 1320 may include main memory, disk storage, or any suitable combination thereof. The memory/storage devices 1320 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

A number of examples, relating to implementations of the techniques described above, will next be given.

In a first example, an apparatus of a baseband processor for User Equipment (UE) may comprise an interface to radio circuitry of the UE; and one or more processors to: determine a transmission power of the UE over a number of Orthogonal Frequency-Division Multiplexing (OFDM) symbols that is less than a number of OFDM symbols in a subframe; derive a power headroom value based on the determined UE transmission power; and control transmission, using the interface to the radio circuitry, of a power headroom report, that includes the power headroom value.

In example 2, the subject matter of example 1, or any of the examples herein, wherein the transmission power is determined over two consecutive OFDM symbols.

In example 3, the subject matter of example 1, or any of the examples herein, wherein the transmission power is determined over seven consecutive OFDM symbols.

In example 4, the subject matter of example 1, or any of the examples herein, wherein the transmission power is determined over a period corresponding to a shortened Transmission Time Interval (sTTI).

In a fifth example, a UE apparatus may include a computer-readable medium for storing instructions, that when executed by one or more processors of the UE, cause the UE to: select a number of Orthogonal Frequency-Division Multiplexing (OFDM) symbols over which transmission power of the UE is to be determined, the selecting including selecting the number of OFDM symbols as the number of symbols in a shortened Transmission Time Interval (sTTI) when the UE is configured to use sTTIs, and selecting the number of OFDM symbols as the number of symbols in a subframe when the UE is not configured to use sTTIs; determine a transmission power of the UE over a selected number of OFDM symbols; derive a power headroom value based on the determined UE transmission power; and control transmission of a power headroom report, that includes the power headroom value.

In example 6, the subject matter of example 5, or any of the examples herein, wherein, when the UE is configured to use sTTIs, the selected number of OFDM symbols is two OFDM symbols.

In example 7, the subject matter of example 5, or any of the examples herein, wherein, when the UE is configured to use sTTIs, the selected number of OFDM symbols is seven OFDM symbols.

In example 8, the subject matter of example 1 or 5, or any of the examples herein, wherein the one or more processors are further to determine the transmission power of the UE by: estimating the transmission power of the UE over a plurality of shortened Transmission Time Interval (sTTI) periods within a subframe; and averaging the estimated transmission power values corresponding to the plurality of sTTI periods to obtain an average value, wherein the power headroom value is based on the average value.

In example 9, the subject matter of example 1 or 5, or any of the examples herein, wherein the one or more processors are further to determine the transmission power of the UE by: estimating the transmission power of the UE over a plurality of shortened Transmission Time Interval (sTTI)

periods within a subframe; and selecting a maximum one of the estimated transmission power values corresponding to the plurality of sTTI periods, wherein the power headroom value is based on the selected maximum value.

In example 10, the subject matter of example 1 or 5, or any of the examples herein, wherein the one or more processors are further to determine the transmission power of the UE by: estimating the transmission power of the UE over a plurality of shortened Transmission Time Interval (sTTI) periods within a subframe; and selecting a minimum one of the estimated transmission power values corresponding to the plurality of sTTI periods, wherein the power headroom value is based on the selected minimum value.

In example 11, the subject matter of example 1 or 5, or any of the examples herein, wherein the one or more processors are further to determine the transmission power of the UE by: estimating the transmission power of the UE over a plurality of shortened Transmission Time Interval (sTTI) periods within a subframe; and selecting a first one of the estimated transmission power values corresponding to the plurality of sTTI periods, wherein the power headroom value is based on the selected first value.

In example 12, the subject matter of example 1 or 5, or any of the examples herein, wherein the one or more processors are further to determine the transmission power of the UE by: estimating the transmission power of the UE over a plurality of shortened Transmission Time Interval (sTTI) periods within a subframe; and selecting a last one of the estimated transmission power values corresponding to the plurality of sTTI periods, wherein the power headroom value is based on the selected last value.

In a thirteenth example, an apparatus including User Equipment (UE) may comprise a computer-readable medium containing program instructions; and one or more processors to execute the program instructions to: determine a transmission power of the UE over a number of Orthogonal Frequency-Division Multiplexing (OFDM) symbols that is less than a number of OFDM symbols in a subframe; derive a power headroom value based on the determined UE transmission power; and transmit a power headroom report that includes the power headroom value.

In example 14, the subject matter of example 13, or any of the examples herein, wherein the one or more processors are further to determine the transmission power of the UE by: estimating the transmission power of the UE over a plurality of shortened Transmission Time Interval (sTTI) periods within the subframe; and averaging the estimated transmission power values corresponding to the plurality of sTTI periods to obtain an average value, wherein the power headroom value is based on the average value.

In example 15, the subject matter of example 13, or any of the examples herein, wherein the one or more processors are further to determine the transmission power of the UE by: estimating the transmission power of the UE over a plurality of shortened Transmission Time Interval (sTTI) periods within the subframe; and selecting a maximum one of the estimated transmission power values corresponding to the plurality of sTTI periods, wherein the power headroom value is based on the selected maximum value.

In example 16, the subject matter of example 13, or any of the examples herein, wherein the one or more processors are further to determine the transmission power of the UE by: estimating the transmission power of the UE over a plurality of shortened Transmission Time Interval (sTTI) periods within the subframe; and selecting a minimum one of the estimated transmission power values corresponding to the plurality of sTTI periods, wherein the power headroom value is based on the selected minimum value.

In example 17, the subject matter of example 13, or any of the examples herein, wherein the one or more processors are further to determine the transmission power of the UE by: estimating the transmission power of the UE over a plurality of shortened Transmission Time Interval (sTTI) periods within the subframe; and selecting a first one of the estimated transmission power values corresponding to the plurality of sTTI periods, wherein the power headroom value is based on the selected first value.

In example 18, the subject matter of example 13, or any of the examples herein, wherein the one or more processors are further to determine the transmission power of the UE by: estimating the transmission power of the UE over a plurality of shortened Transmission Time Interval (sTTI) periods within the subframe; and selecting a last one of the estimated transmission power values corresponding to the plurality of sTTI periods, wherein the power headroom value is based on the selected last value.

In example 19, the subject matter of example 13, or any of the examples herein, wherein the transmission power is determined over two consecutive OFDM symbols.

In example 20, the subject matter of example 13, or any of the examples herein, wherein the transmission power is determined over seven consecutive OFDM symbols.

In example 21, the subject matter of example 13, or any of the examples herein, wherein the transmission power is determined over a period corresponding to a shortened Transmission Time Interval (sTTI).

In a twenty-second example, a computer readable medium containing program instructions for causing a device to perform the method of: determining a transmission power of the UE over a number of Orthogonal Frequency-Division Multiplexing (OFDM) symbols that is less than a number of OFDM symbols in a subframe; deriving a power headroom value based on the determined UE transmission power; and transmitting a power headroom report that includes the power headroom value.

In example 23, the subject matter of example 22, or any of the examples herein, wherein the transmission power is determined over two consecutive OFDM symbols.

In example 24, the subject matter of example 22, or any of the examples herein, wherein the transmission power is determined over seven consecutive OFDM symbols.

In example 25, the subject matter of example 22, or any of the examples herein, wherein the transmission power is determined over a period corresponding to a shortened Transmission Time Interval (sTTI).

In example 26, the subject matter of example 22, or any of the examples herein, wherein the computer readable medium further contains program instructions to cause the device to: estimate the transmission power of the UE over a plurality of shortened Transmission Time Interval (sTTI) periods within the subframe; and average the estimated transmission power values corresponding to the plurality of sTTI periods to obtain an average value, wherein the power headroom value is based on the average value.

In example 27, the subject matter of example 22, or any of the examples herein, wherein the computer readable medium further contains program instructions to cause the device to: estimate the transmission power of the UE over a plurality of shortened Transmission Time Interval (sTTI) periods within the subframe; and select a maximum one of the estimated transmission power values corresponding to the plurality of sTTI periods, wherein the power headroom value is based on the selected maximum value.

In example 28, the subject matter of example 22, or any of the examples herein, wherein the computer readable medium further contains program instructions to cause the device to: estimate the transmission power of the UE over a plurality of shortened Transmission Time Interval (sTTI) periods within the subframe; and select a minimum one of the estimated transmission power values corresponding to the plurality of sTTI periods, wherein the power headroom value is based on the selected minimum value.

In a twenty-ninth example, a method, performed by User Equipment (UE), may comprise: determining a transmission power of the UE over a number of Orthogonal Frequency-Division Multiplexing (OFDM) symbols that is less than a number of OFDM symbols in a subframe; deriving a power headroom value based on the determined UE transmission power; and transmitting a power headroom report that includes the power headroom value.

In example 30, the subject matter of example 29, or any of the examples herein, wherein the transmission power is determined over two consecutive OFDM symbols.

In example 31, the subject matter of example 29, or any of the examples herein, wherein the transmission power is determined over seven consecutive OFDM symbols.

In example 32, the subject matter of example 29, or any of the examples herein, wherein the transmission power is determined over a period corresponding to a shortened Transmission Time Interval (sTTI).

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 3-10, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. A User Equipment (UE) apparatus including a computer-readable medium for storing instructions, that when executed by one or more processors of the UE, cause the UE to:
    select a first number of Orthogonal Frequency-Division Multiplexing (OFDM) symbols over which transmission power of the UE is to be determined, the selecting including
    selecting the first number of OFDM symbols as the number of symbols in a shortened Transmission Time Interval (sTTI) when the UE is configured to use sTTIs, and
    selecting the first number of OFDM symbols as the number of symbols in a subframe when the UE is not configured to use sTTIs;
    determine a transmission power of the UE;
    select a second number of OFDM symbols over which a power headroom value is to be derived;
        derive the power headroom value based on the determined UE transmission power over the second number of OFDM symbols, wherein the second number of OFDM symbols is configured by the UE; and
        control transmission of a power headroom report, that includes the power headroom value.

2. The apparatus of claim 1, wherein, when the UE is configured to use sTTIs, the selected second number of OFDM symbols in deriving the power headroom value is two OFDM symbols.

3. The apparatus of claim 1, wherein, when the UE is configured to use sTTIs, the selected second number of OFDM symbols in deriving the power headroom value is seven OFDM symbols.

4. The apparatus of claim 1, wherein when the first number of OFDM symbols and the second number of OFDM symbols is the same number.

5. An apparatus including User Equipment (UE) comprising:
    a computer-readable medium containing program instructions; and
    one or more processors to execute the program instructions to:
        determine a transmission power of the UE over a first number of Orthogonal Frequency-Division Multiplexing (OFDM) symbols that is less than a number of OFDM symbols in a subframe;
        derive a power headroom value based on the determined UE transmission power over a second number of OFDM symbols, wherein the second number of OFDM symbols is configured by the UE; and
        transmit a power headroom report that includes the power headroom value.

6. The apparatus of claim 5, wherein the power headroom value is estimated over a UE configured number of two consecutive OFDM symbols.

7. The apparatus of claim 5, wherein the power headroom value is estimated over a UE configured number of seven consecutive OFDM symbols.

8. The apparatus of claim 5, wherein the first number of OFDM symbols and the second number of OFDM symbols is the same number.

* * * * *